United States Patent [19]

Janes et al.

[11] Patent Number: 4,799,705
[45] Date of Patent: Jan. 24, 1989

[54] TRAILER HITCHING AID

[76] Inventors: John B. Janes, R.R. No. 3, Lambeth, Ontario, Canada, N0L 1S0; Carson I. Anderson, R.R. No. 1, Muirkirk, Ontario, Canada, N0L 1X0

[21] Appl. No.: 50,164

[22] Filed: May 15, 1987

Related U.S. Application Data

[63] Continuation of Ser. No. 808,467, Dec. 13, 1985, abandoned.

[30] Foreign Application Priority Data

Dec. 2, 1985 [CA] Canada .................................. 496711

[51] Int. Cl.⁴ .............................................. B60D 1/02
[52] U.S. Cl. .................................... 280/477; 280/508
[58] Field of Search ............... 280/433, 434, 435, 436, 280/477, 478 R, 478 B, 508

[56] References Cited

U.S. PATENT DOCUMENTS

| | | | |
|---|---|---|---|
| 2,464,424 | 3/1949 | Weldon et al. | 280/477 |
| 2,666,653 | 1/1954 | Diuble | 280/478 R |
| 3,123,380 | 3/1964 | Grim et al. | 280/477 X |
| 3,325,186 | 6/1967 | Lund | 280/477 |
| 3,421,780 | 1/1969 | Rimmey | 280/477 X |
| 3,565,459 | 2/1971 | Reid | 280/477 |

Primary Examiner—John J. Love
Assistant Examiner—Charles R. Watts

[57] ABSTRACT

The hitching aid disclosed is for use with agricultural tractors. It is used to allow the tractor to be backed onto a trailer, whereupon the trailer becomes automatically hitched to the tractor. The aid includes a converging channel which receives the head of the trailer's drawpin. The channel draws the pin-head into a throat, thus aligning the pin before the pin enters the pin-receiving jaws. Thus, any abusive loads due to mismatch, etc., are taken by the bulbous head of the pin and the channel, rather than by the shank of the pin and the jaws.

1 Claim, 1 Drawing Sheet

TRAILER HITCHING AID

FIELD OF THE INVENTION

This is a continuation of application number 808,467 entitled TRAILER HITCHING AID, filed Dec. 13, 1985, now abandoned.

This invention relates to hitches, used for attaching and detaching vehicles from one another. Although the hitch could be used for many kinds of vehicles, it is mainly intended for use with farm equipment, such as in situations where a wagon or other vehicle is to be connected to a tractor or other prime mover for pulling.

For convenience throughout this specification and in the claim, the term "tractor" will be used to designate any prime mover, and the term "wagon" to designate any secondary vehicle intended to be towed by the prime mover.

Frequently in the operation of powered farm vehicles such as tractors, it is necessary to pull another vehicle, such as a wagon. Without a hitching aid, the tractor operator must back the tractor into a position near the wagon tongue, dismount, connect the wagon tongue to the tractor, and then remount the tractor. This is obviously very time consuming and difficult, especially if the wagon is loaded and difficult to move, necessitating jockeying the tractor into position for the coupling. The task becomes particularly onerous if, as if often the case, the process must be repeated many times in the course of a day.

The present invention provides a hitch for connecting the wagon tongue to the tractor by simply backing the tractor up to the approximate position of the wagon tongue until the connection is made. The tractor operator can disconnect the wagon by simply pulling a release cable connected to the hitch, causing the wagon to be immediately released from the tractor.

DESCRIPTION OF THE PRIOR ART

Hitching aids of various types are well known in the prior art. Typically, their parts connect automatically on contact when the tractor is backed up to the wagon. The tractor hitch component is provided with guide means to guide the wagon tongue into engagement with the hitch. A typical example is that described in U.S. pat. no. 3,565,459 (Reid), which discloses a "jaw unit" and a guide member attached to the tractor draw bar. The guide member is in the form of a tapered ramp with sidewalls, for guiding the wagon tongue up and into the jaw unit. In order to avoid needing to have the guide member be located too close to the ground, where it would be vulnerable to damage, the wagon tongue is provided with a frame to support it above the ground.

SUMMARY OF THE INVENTION

It is an object of the present invention to provide an improved hitching aid for connecting a towed vehicle such as a wagon to a prime mover such as a tractor, especially one which may be controlled by the operator of the tractor without the need for dismounting.

The invention provides that the head of the pin—and not the shank—is the component on the trailer that first strikes the tractor.

The standard pin itself is of course designed to be adequate to transmit hitching and towing forces. But the shank of the pin only needs to be relatively slender to perform that task. It is recognised in the invention that the relatively slender pin-shank is not a component of the hitching mechanism that one can afford to have subject to heavy blows, mismatch and other spurious forces and abusive treatment. The pin can only perform properly as a hitch pin over an adequate service life if it is protected from blows and abuse.

That is why previous quick-hitch units have provided components that must be added onto the trailer. Their designers have mostly—and quite sensibly—abandoned the idea of allowing the slender pin-shank itself to act as a jaw pick-up component.

In the invention, this fragility of the pin, and its vulnerability, are recognised. In the invention, the standard slender pin-shank is retained to perform its normal hitch transmission duties, but the pin-shank is not itself required to be the component that determines the alignment of the pin-shank with the jaws.

Besides the pin itself being fragile, it is also recognised in the invention that the jaws are fragile. If the jaws were to be strong enough to cope with impacts and rough treatment during the lining-up stage, then the jaws would have to be very heavy and strong, and so of course would the jaw pivots. In the invention, not only the pin-shank, but the jaws too are isolated and protected and relieved of the abusive alignment duties.

In the invention, these benefits are achieved by providing a channel to receive and guide the head of the pin. The head, together with the channel, therefore are the components that take the abuse. The channel is convergent down to a throat which progressively constrains the head. The effect is that when the head of the pin enters the throat the pin at that moment is constrained, and it is arranged that the pin is constrained into alignment with the jaws. The pin can therefore enter the jaws always in a predetermined manner. The pin and the jaws need not be designed to cope with blows and heavy abuse, and therefore the standard slender hitch pin-shank can be used, and furthermore the jaws, and the jaw pivots, can be simple and relatively light.

This is a huge advantage, and is brought about, in the invention, by guiding the head of the pin into the throat of a convergent channel, before allowing the pin to enter the jaws.

The head of the pin preferably is a bulbous knob, to better resist the knocks it receives upon entering the channel.

With the invention, the draw bar on the trailer remains as standard, so that the trailer can be used whether or not the tractor is fitted with the hitching aid.

The construction of the invention is such that the trailer can be approached from essentially within a 180 degree arc, (90 degrees on either side of the draw bar).

Further features of the invention will be described or will become apparent in the course of the following detailed description.

BRIEF DESCRIPTION OF THE DRAWINGS

In order that the invention may be more clearly understood a preferred embodiment thereof will now be described in detail by way of example, with reference to the accompanying drawings, in which.

DETAILED DESCRIPTION OF THE PREFERRED EMBODIMENT

Figure 1:
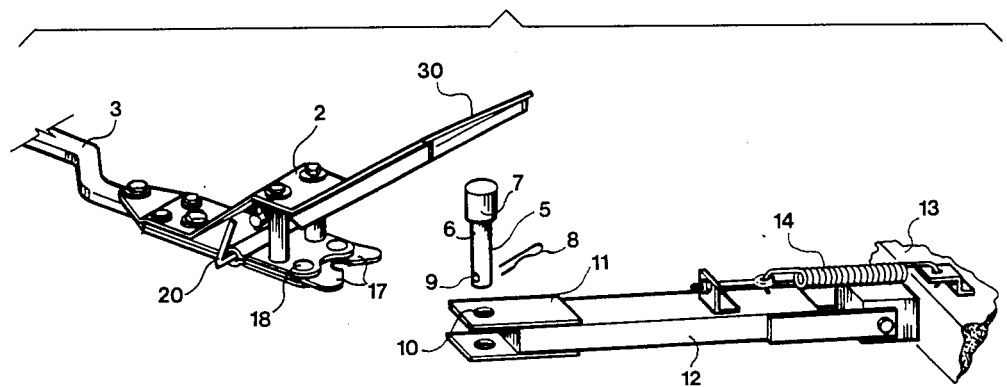
FIGS. 1 and 2 are pictorial views of a hitching aid which embodies the invention.
Figure 2:
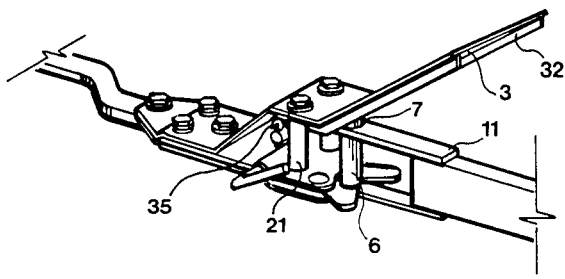
Figure 3:
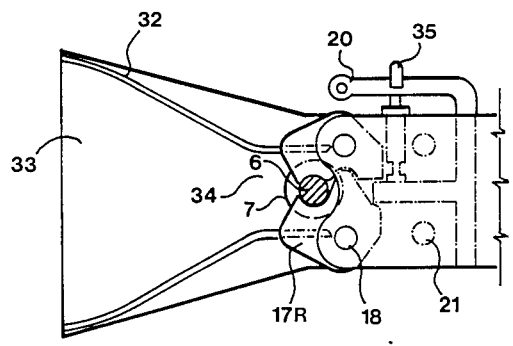
FIG. 3 is a plan view of the aid of FIG. 1.

Referring to the figures, the hitching aid 1 comprises a body 2 which in use is attached to the draw bar 3 at the rear of the tractor and a draw pin 5 which is installed through holes 10 in the two forward-projecting draw-tongue members 11 of a conventional wagon tongue 12. The wagon tongue is pivotally connected to the wagon 13, for rotation about a horizontal axis, and an adjustable spring 14 connect the wagon tongue to the wagon to bias the wagon tongue off the ground and into a horizontal or somewhat above horizontal position. The spring 14 is made adjustable in order that the usual height of the wagon tongue 12 above the ground may be adjusted from time to time as required.

The draw pin 5 consists of a shank 6 which passes through the holes 10 in the wagon tongue 12, and a bulbous knob portion 7 which supports the shank 6 and rides above the upper one of the two draw-tongues 11. A spring clip 8 is installed in a hole 9 near the lower portion of the shaft 6 once the draw pin 5 is installed on the wagon tongue 12, in order to prevent the draw pin 5 from accidentally popping out of the wagon tongue 12.

The body 2 includes an automatic coupler 16, including jaws 17 which receive the draw pin 5.

The body 2 is formed with a channel 30, which comprises a roof 31 and side walls 32. The purpose of the channel 30 is to guide the head 7 of the draw pin 5 into the jaw members 17. The roof 31 has a relatively wide outer end or mouth 33 from which the side walls 32 converge towards a narrow throat 34.

The coupler assembly used in the preferred embodiment is commercially available. The coupler 16, including the jaws 17, itself is not what constitutes the present invention, although it is a vital part of the overall structure. Any other suitable automatic coupler of the same general type could be used.

The coupler 16 comprises the aforementioned jaw members 17 mounted in a clevis for pivoting in and out about two vertically oriented clevis pins 18.

In use, the tractor is backed up towards the wagon 13 in such a fashion that the wagon tongue 12 and the draw pin 5 come into the region of the body. The knob 7 of the draw pin 5 comes into contact with the roof 31 of the channel 30, and as the tractor 4 is further reversed, the roof 31 and the channel side walls 32 force the knob 7 of the draw pin 5 downward, and progressively into the throat 34. When the shank 6 contacts the jaws 17, the jaw 17R is pushed backwards, until the jaws snap closed around the shank 6.

When the operator wishes to disconnect the wagon 13 from the tractor, he pulls a cable to operate the release lever 20, causing the jaws 17 to open. The operator can then simply drive the tractor 4 away from the wagon 13. A hook 35 is provided, which co-operates with the lever 20 to prevent the jaws from being opened accidentally.

The body 2 is bolted to the tractor draw bar 3. The roof 31 is supported above the jaws 17 by long bolts 21 and is also bolted to the tractor draw bar 3.

It is a particular advantage of the present invention that the only adaptation which needs to be made to most wagons 13 is the insertion of the draw pin 5 into the wagon tongue 12. Thus no complicated structure need be attached to each wagon tongue 12. This feature is important in view of the fact that, in the farm situation for example, there may be a number of wagons which are routinely towed. The need for a complicated attachment to the wagon tongue 12 would add unnecessarily and undesirably to the difficulty and expense with which such a system could be adopted. All that is required in the case of the present invention is that each wagon tongue 12 be fitted with a draw pin 5, and each draw pin 5 is of very simple construction and is accordingly quite inexpensive.

We claim:

1. A trailer hitching aid for use between a tractor and a trailer, said tractor being of the type having a rearwardly projecting draw bar, and said trailer being of the type including a forwardly-projecting draw-tongue having upper and lower plate members each with a hole, the holes being substantially vertically aligned with each other, said hitching aid comprising:

a draw-pin having a shank portion for installation down into said holes and having a large bulbous head of diameter substantially greater than the diameter of said shank portion for resting against and protruding above said upper plate member when said shank portion is so installed; and a hitch assembly for engaging the installed shank portion between said upper and lower plate members, said hitch assembly comprising:

a support member for attachment to said draw bar of said tractor;

a jaws member carried by said support member, said jaws member comprising two jaw elements pivoted about substantially vertical axes for movement towards and away from each other, for receiving said shank portion between said upper and lower plate members, and means for locking said jaws member to prevent release of said shank portion received;

an upwardly and rearwardly diverging channel member rigidly mounted on said support member, said channel member comprising a roof and two side walls and having a narrow throat end and a wider mouth end; said narrow throat end being only minimally larger than the diameter of said bulbous head of said draw-pin, said channel member being positioned with its narrow throat end proximate to said jaws member such that said jaws member receives said shank portion of said draw-pin between said upper and lower plate members as said bulbous head of said draw-pin passes through said narrow throat with the top of said bulbous head in contact with the underside of said roof of said channel member; said channel member includes a forward portion which is rigidly fastened to said draw bar, and an intermediate portion spaced above said jaws member; and support means rigidly connected between said intermediate portion and said jaws member for rigidly maintaining said intermediate portion spaced above said jaws member.

* * * * *